United States Patent [19]

Marchak

[11] Patent Number: 4,722,874
[45] Date of Patent: Feb. 2, 1988

[54] ELECTROCHEMICAL CELL PRESSURE RELIEF DEVICES

[75] Inventor: Geordon E. Marchak, Vancouver, Canada

[73] Assignee: Moli Energy Limited, Canada

[21] Appl. No.: 892,810

[22] Filed: Aug. 1, 1986

[51] Int. Cl.⁴ .............................................. H01M 2/12
[52] U.S. Cl. ................................. 429/56; 220/89 A; 222/397
[58] Field of Search ................. 429/56, 53; 220/89 A; 222/397

[56] References Cited

U.S. PATENT DOCUMENTS

| | | | |
|---|---|---|---|
| 2,525,436 | 10/1950 | Williams | 429/56 |
| 3,204,156 | 8/1965 | Moresi et al. | 429/56 |
| 3,831,822 | 8/1974 | Zundel | 222/397 |
| 4,175,166 | 11/1979 | Rosansky | 429/56 |
| 4,237,203 | 12/1980 | Tsuchida et al. | |
| 4,256,812 | 3/1981 | Tamura et al. | |
| 4,476,200 | 10/1984 | Markin et al. | |
| 4,484,691 | 11/1984 | Lees | 429/56 |
| 4,601,959 | 7/1986 | Romero | 429/53 |
| 4,610,370 | 9/1986 | Patterson et al. | 429/56 |

Primary Examiner—Donald L. Walton
Attorney, Agent, or Firm—Lerner, David, Littenberg, Krumholz & Mentlik

[57] ABSTRACT

An electrochemical cell container having pressure relief means. An end wall of the cell has a central portion aligned with the central axis of the cell, and pressure relief tabs remote from the central axis. The pressure relief tabs are partially bounded by score lines, and bridge portions are provided for retaining the central portion when the score lines rupture to relieve excess pressure within the cell. The retained central portion holds solid internal components within the cell. Upon rupture of the score lines, the tabs serve as vanes for directing the discharged fluids so as to minimize translational acceleration of the cell caused by the discharged fluids.

18 Claims, 8 Drawing Figures

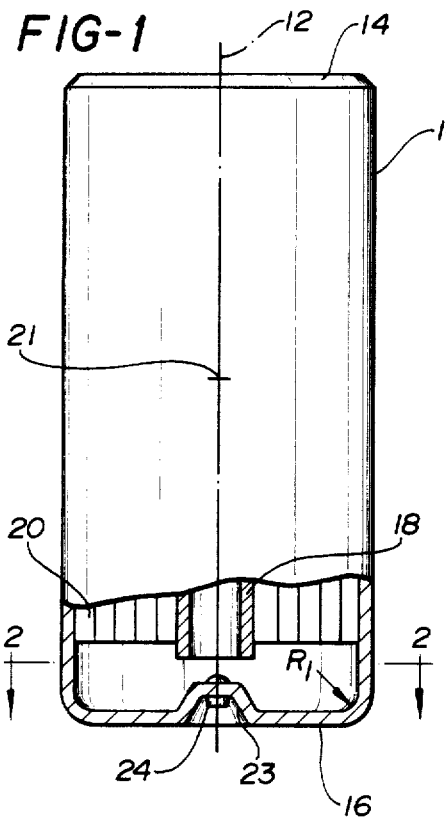
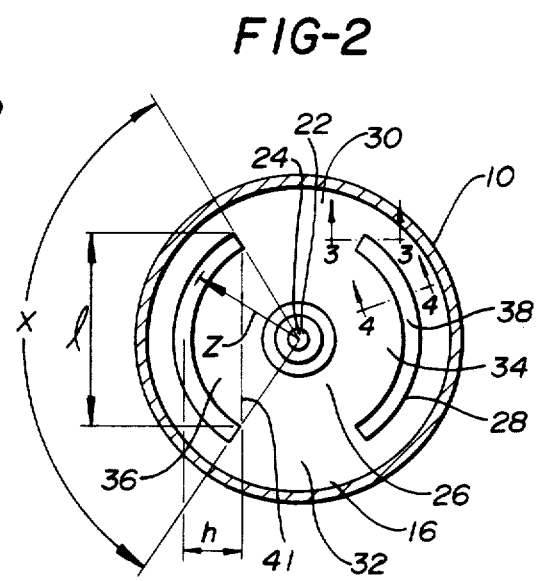
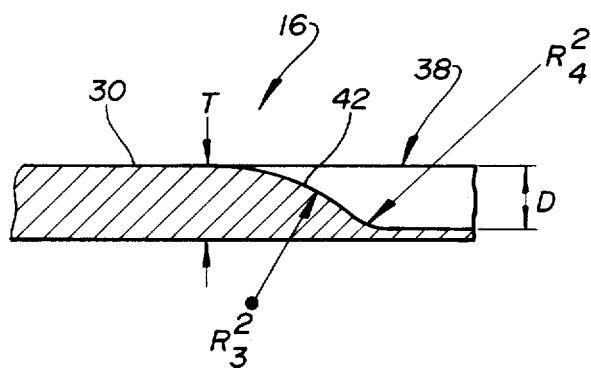
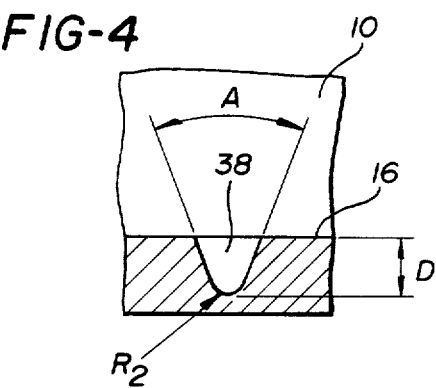
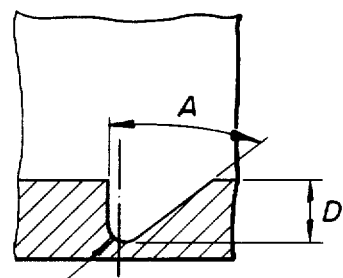

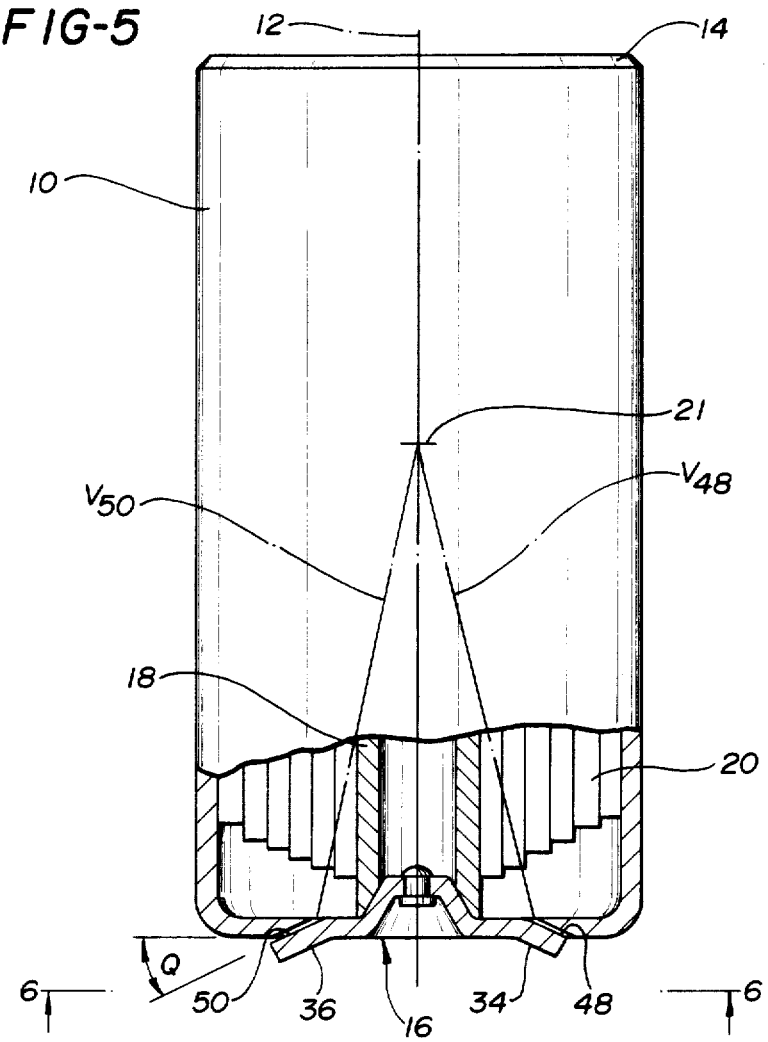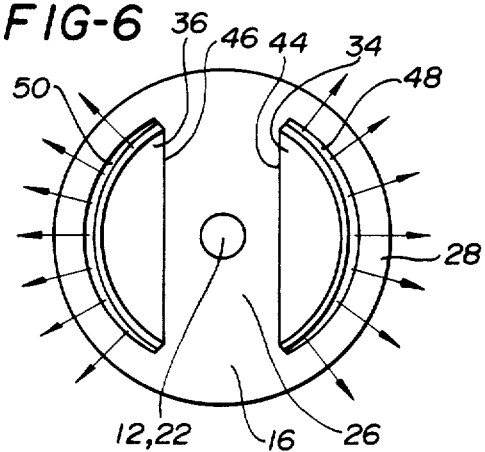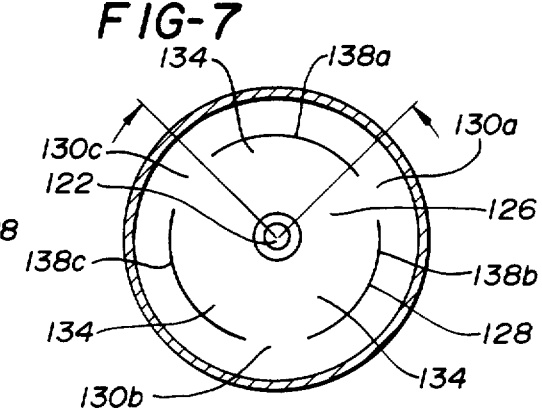

ELECTROCHEMICAL CELL PRESSURE RELIEF DEVICES

BACKGROUND OF THE INVENTION

The present invention relates to electrochemical cells and more particularly relates to pressure relief structures for electrochemical cell containers.

Electrochemical cells such as galvanic cells for producing electric power typically are arranged in sealed containers such as can-like structures including tubular side walls and generally planar end walls. The container protects the interior components of the cell from the environment, protects surrounding structures from corrosive materials within the ell, and typically also serves as an electrical conductor in the cell structure. Certain types of electrochemical cells, however, can evolve substantial quantities of gases under abnormal conditions such as short circuited operation or exposure to extremely high ambient temperatures, as during a fire. Accordingly, the sealed containers for such cells have been provided heretofore with pressure relief devices. Typically, such pressure relief devices have included one or more frangible portions of the container wall adapted to break in a controlled fashion under the influence of excessive internal pressures within the container.

The pressure relief devices have ordinarily been disposed in the end walls of the container. For example, Markin et al, U.S. Pat. No. 4,476,200 discloses a galvanic cell container having a polymeric end wall with a frangible, polymeric disc adjacent an edge of the end wall. Tsuchida et al, U.S. Pat. No. 4,237,203 also employs a rupturable polymeric gasket. Tamura et al, U.S. Pat. No. 4,256,812 shows a galvanic cell container with an end wall having score lines extending in a cruciform pattern, so that the end wall will rupture along the cruciform score lines when an excessive pressure is attained within the cell. Dey et al, U.S. Pat. No. 4,533,609 utilizes an end wall defined by a cap formed separately from the tubular side wall of the container. The cap-defining end wall is fitted to the side wall so that excessive pressures within the container will blow the cap entirely away from the side wall. Also, Lees, U.S. Pat. No. 4,484,691 discloses a container having deformed, wrinkled portions arranged so that internal pressures within the container tend to flatten the wrinkled portions. Small score lines are disposed at the ends of the wrinkled portions so that when the container is subjected to an excessive internal pressure, the container wall ruptures at these score lines, the rupturing action being assisted by the deformed wrinkled portions. As taught by Lees et al, the deformed, wrinkled portions may be arcuate and may be disposed on an end wall of the container, or may be disposed on the tubular side wall of the container.

Although venting or pressure relief systems utilized heretofore can indeed relieve excessive pressures caused by gas evolution within an electrochemical cell, the systems utilized heretofore have created additional problems. With certain of the venting systems utilized heretofore, solid components of the cell can escape through the opening provided for pressure relief. These components may be projected with substantial energy from the cell and may pose hazards to personnel and equipment in the vicinity of the cells. Moreover, solid components of the interior cell structure projected from the pressure relief opening by the flowing gas can carry corrosive or otherwise dangerous materials out of the cell and hence create a hazard to surrounding structures and personnel.

Moreover, the fluids issuing from the pressure relief opening create a substantial reaction force on the cell container itself, in much the same way as the exhaust gases issuing from a rocket motor apply a reaction force to the rocket. The reaction forces applied by the gases tend to accelerate the cell. With a violent release of gases as may be encountered with a severe overpressure condition, the cell can become a dangerous flying projectile.

There have accordingly been significant needs heretofore for improvements in pressure relief devices for electrochemical cells. Moreover, there have been additional needs for electrochemical cell pressure relief devices which can be incorporated in the cell at minimal cost and which will nonetheless function reliably.

SUMMARY OF THE INVENTION

The present invention provides improved walls for electrochemical cell containers which incorporate pressure relief devices, and provides improved electrochemical cells incorporating pressure relief devices.

An electrochemical cell according to one aspect of the present invention includes a sealed container and electrochemical means for producing a voltage disposed within the sealed container. Pressure relief means are provided for discharging fluids from within the container at at least one pressure relief location on a wall of the container remote from the center of mass of the cell when the pressure within the container exceeds a predetermined limit. The pressure relief means most preferably includes directing means for directing the fluid discharged at each relief location in a direction substantially transverse to the vector from the center of mass to the relief location. The reaction force or thrust applied by the discharged fluids to the cell is necessarily directed opposite to the direction of flow of the fluids. Thus, the thrust is directed transversely to the vector from the center of mass to the relief location. Accordingly, the thrust applied by the discharged fluid will tend to spin the cell about its center of mass rather than to accelerate the cell in a straight line. The cell therefore will not become a fast moving projectile upon operation of the pressure relief means.

Preferably, the pressure relief means includes a pressure relief tab formed integrally with a wall of the sealed container at each pressure relief location. A curved line of frangibility is provided in the wall at each such pressure relief location, each curved line of frangibility extending only partially around the associated pressure relief tab. The container wall preferably is adapted to fracture only at each curved line of frangibility. Each tab remains attached to the container and bends slightly outwardly from the container when the container wall ruptures at the line of frangibility. Each tab thus serves as a vane for directing the discharged fluid. A plurality of discharge locations may be provided, and the directing means may be arranged to direct the fluid discharged at the various relief locations in generally opposite directions. Thus, the reaction forces or thrusts applied to the cell by the fluids issuing at the various relief locations tend to cancel one another, thus further minimizing the tendency of the cell to accelerate upon operation of the pressure relief device and also minimizing the tendency of the cell to spin.

In addition, the prior art has taught away from the use of simple score lines for pressure relief purposes in batteries. For example, the Lees patent (U.S. Pat. No. 4,484,691) discussed above specifically states that "Simple grooves in the wall of a container such as have been used in capacitors have the additional deficiencies of lengthy tear propogations—(Column 1, lines 46-48) and"—the simple grooves of the prior art which must be layered to be effective and therefore would have the disadvantages of being more susceptible to mechanical or corrosive damage and to formation of wide openings. (Column 3, lines 44-48). In accordance with the present invention, however, and directly contrary to these teachings, simple grooves or score lines can now be used and each of these problems can nevertheless now be avoided.

The container of an electrochemical cell according to the present invention may be a can-like structure including an elongated tubular side wall defining a central axis and an end wall sealingly connected to the side wall at one end thereof, the end wall being remote from the center of mass of the cell. Preferably, the pressure relief locations are disposed at the end wall and the discharged fluid is directed along the end wall transverse to the central axis.

According to a further aspect, the present invention provides a unitary end wall for an electrochemical cell container. The end wall has a central portion encompassing the center of the wall and a peripheral portion surrounding the central portion. Bridge means preferably including at least two bridge portions are provided for connecting the central portion to the peripheral portion, and a pressure relief tab is provided at a portion of the wall remote from the center of the wall. A curved line of frangibility preferably extends only partially around the pressure relief tab, the wall being adapted to fracture along the curved line of frangibility upon exposure to an excessive pressure, so that the pressure relief tab will bend away from the remainder of the wall and will provide an opening for relief of the pressure remote from the center of the wall. The bridge portions are adapted to retain the central portion in place relative to the peripheral portion upon fracture of the wall along the curved line of frangibility.

An end wall according to this aspect of the present invention may be incorporated in a typical, can-like container for an electrochemical cell, having a tubular side wall defining a central axis, the tubular side wall being connected to the end wall about the periphery thereof so that the central axis passes through the center of the end wall. Thus, the central portion of the end wall is aligned with the central axis of the tubular container. As the most massive solid, internal components of typical electrochemical cells, notably spiral-wound cells, are disposed on or adjacent the central axis of the tubular container, the most massive solid components will be aligned with the central portion of the end wall. Because the central portion of the end wall is retained in position relative to the peripheral portion and hence retained in position relative to the remainder of the container, the central portion of the end wall will retain the massive solid components when the wall ruptures at the line of frangibility to relieve excess internal pressures.

Preferably, the curved line of frangibility is concave towards the center of area of the end wall and extends from one of the bridge portions to another one of the bridge portions adjacent the peripheral portion of the end wall. The end wall preferably includes a plurality of such pressure relief tabs and a plurality of curved lines of frangibility associated therewith, the pressure relief tabs and lines of frangibility most preferably being symmetrical about the center of area of the wall. In a particularly preferred arrangement, only two pressure relief tabs and two curved lines of frangibility in the form of arcs centered on the center of area are provided, and the central portion of the end wall is secured to the peripheral portion by two diametrically opposed bridge portions.

End walls according to this aspect of the present invention can be fabricated at very little additional cost beyond that incurred in fabrication of a conventional end wall without any pressure relief features. End walls according to this aspect of the present invention, and containers and cells incorporating such end walls, provide reliable and safe pressure relief action.

These and other objects, features and advantages over the present invention will be more readily apparent from the detailed description of the preferred embodiments set forth below, taken in conjunction with the accompanying drawings.

BRIEF DESCRIPTION OF THE DRAWINGS

FIG. 1 is a schematic, partially sectional view of an electrochemical cell according to one embodiment of the present invention under normal operating conditions.

FIG. 2 is a sectional view taken along line 2—2 in FIG. 1.

FIGS. 3 and 4 are fragmentary sectional views, on an enlarged scale, taken along lines 3—3 and 4—4, respective in FIG. 2.

FIG. 4a is a fragmentary sectional view, or an enlarged side, of an alternative to the configuration shown in FIG. 4.

FIG. 5 is a view similar to FIG. 1 but showing the electrochemical cell under a condition of excessive internal pressure.

FIG. 6 is a view taken along line 6—6 in FIG. 5.

FIG. 7 is a view similar to FIG. 2 but depicting a cell in accordance with another embodiment of the present invention.

DETAILED DESCRIPTION OF THE PREFERRED EMBODIMENTS

An electrochemical cell according to one embodiment of the present invention includes a generally tubular side wall 10 of circular cross section, the tubular side wall defining a central axis 12 extending along the geometric center of the tube. A circular cap wall 14 is sealingly connected to one end of side wall 10, whereas a circular end wall 16 is sealingly connected to the opposite end of the side wall. End wall 16 is formed integrally with side wall 10, the end wall blending with the side wall along a transition section having a radius $R_1$. Both end wall 16 and cap wall 14 extend transversely to axis 12. The side wall, end wall and cap wall cooperatively define a sealed container. Disposed within the container are the active elements of a lithium-molybdenium disulfide galvanic cell which include a rigid tubular mandrel 18 extending along central axis 12 and spiral windings 20 wrapped around mandrel 18. The spiral windings include lithium films, molybdenium disulfide films and porous polymeric separators interleaved between the lithium and molybdenium disulfide films. The center of mass 21 of the cell is disposed on central axis 12 remote from end wall 16.

The center 22 of end wall 16 is aligned with the central axis 12 of the tubular side wall. As best seen in FIG. 1, end wall 16 has a dimple 23 projecting inwardly, into the container, and may also have other minor surface irregularities. Nonetheless, the end wall is a substantially planar structure and is disposed generally in a plane transverse to axis 12. A hole at center 22, in dimple 23, which is provided for use during filling of the cell with electrolyte (not shown) is closed, in the finished cell, by a plug 24 welded to the dimple. The plug serves as part of the end wall in the finished cell, so that the end wall in the finished cell is imperforate.

A central portion 26 of the end wall surrounds and encompasses center 22. The end wall also has a peripheral portion 28 which surrounds central portion 26, peripheral portion 28 being connected to the side wall 10. The end wall also includes two bridge portions 30 and 32 connecting central portion 26 with peripheral portion 28. Bridge portions 30 and 32 are disposed at diametrically opposed locations with respect to center 22. Thus, an imaginary line connecting the centers of the bridge portions would pass through center 22.

Two pressure relief tabs 34 and 36 project in opposite directions from central portion 26. First pressure relief tab 34 is partially bounded by a first curved line of frangibility 38 which extends along partially around tab 34, whereas second pressure relief tab 36 is partially bounded by a second curved line of frangibility 40, which extends only partially around tab 36. Each curved line of frangibility is disposed between the associated pressure relief tab and peripheral portion 28. Each line of frangibility 38 and 40 extends from one bridge portion 30 to the other bridge portion 32. Each of the lines frangibility is concave towards center of area 22, i.e., the center of curvature of each line of frangibility lies on the same side of such line of frangibility as the center of area. In the particular embodiment illustrated, each curved line of frangibility is in the form of an arc centered on center 22. The arcs defined by these lines of weaknesses are of equal radius and subtend equal angles, and the midpoints of the arcs are disposed at diametrically opposed locations with respect to the center of area. Thus, the lines of frangibility and the pressure relief tabs are symmetrical about center 22.

As best seen in FIG. 4, line of frangibility 38 is defined by a score, generally V-shaped in cross section, having an included angle A, depth D and a radius $R_2$ at the apex of the V. An alternative embodiment is shown in FIG. 4a. In this case, the same V-shaped score line is, in essence, tilted inwardly towards the center of wall 16. This particular configuration has certain advantages over that shown in FIG. 4. For example, where the wall 16 is to be produced by a stamping operation, with the configuration of FIG. 4 there is a teaching to displace the material of wall 16 in both directions, i.e. - inwardly towards the center of the wall and outwardly towards its perimeter. However, by doing so, this can tend to increase the diameter of the wall in that area where such stamping has occurred, and thereby possibly cause the wall 16 to take on an oval configuration, creating unnecessary stresses. With the configuration in FIG. 4a, however, material is displaced only inwardly, and this is therefore avoided. The opening of the score faces towards the interior of the sealed container, i.e., upwardly in FIGS. 1, 3 and 4. The score defining line of frangibility 40 is substantially identical in cross section to the score defining line of frangibility 38. Apart from scores 38 and 40, and dimple 13, in the wall 16 is of substantially uniform thickness T throughout. At the ends of the scores, the score depth decreases gradually from the full score depth D so that the wall thickness increases gradually from the small wall thickness at the bottom of the full-depth score to the full wall thickness T. As seen in FIG. 3, the gradual decrease in depth and gradual increase in wall thickness is provided at one end of line of flangibility or score line 38 by a ramp surface 42 extending in the direction of the score line and sloping upwardly from the floor of the score to the inner surface of the full wall-thickness bridge portion 30. Ramp surface 42 can be convex, and have a radius $R_3$. However, it can also be a linearly extending ramp, with no radius $R_3$, or it can be concave, with the radius $R_3$ as the other side of the wall 16. The end of ramp surface 42 joining the lower or floor surface of score 38 is smoothly blended with that lower or floor surface by a small radius $R_4$. The other end of score line 38 has a similar ramp surface, and the ends of score line 40 are likewise provided with the same form of ramp surface.

Each curved line of frangibility or score line 38 and 40 has radius Z, measured from center 22 to the center line of the score and each subtends an included angle X about the center of area. Each pressure relief tab may be taken as including the area in the form of a sector enclosed by the associated curved line of frangibility or score and an imaginary straight line connecting the ends of such curved line of frangibility. Thus, pressure relief tab 36 includes the sector enclosed by curved line of frangibility 40 and an imaginary straight line or chord 41 connecting the ends of the curved line of frangibility 40. As used in this disclosure with reference to a pressure relief tab partially enclosed by a curved line of frangibility, the term "aspect ratio" means the maximum distance from the chord connecting the ends of the curved line of frangibility to the of frangibility line, divided by the length of the chord. Thus, for pressure relief tab 36, the aspect ratio is the figure obtained by dividing maximum distance h by chord length l.

In normal operation, the cell remains in the configuration illustrated in FIG. 1. The imperforate walls 10, 16 and 14 of the container isolate the interior of the container from the outside environment. Although some gas pressure may be produced within the container during normal operations, the gas pressure within the cell normally remains below a predetermined limit and does not pose any danger of a container explosion. Under abnormal conditions however, such as short circuit operation or exposure to very high ambient temperatures such as may be encountered in a fire, the gas pressure within the cell container can rise beyond the predetermined limit. If left unchecked, such a rise in gas pressure could cause the container to explode violently. However, the pressure relief features incorporated in end wall 16 prevent any such explosion.

When the pressure within the container and hence the pressure exerted on wall 16 reaches a predetermined limit, the end wall ruptures only at lines of frangibility or scores 38 and 40. As seen in FIGS. 5 and 6, each of pressure relief tabs 34 and 36 is bent outwardly by the fluid pressure within the container upon rupture of the associated line of frangibility. Thus, tab 34 flexes about a line of flexure 44 (FIG. 6) coincident with the chord connecting the ends of the associated curved line of frangibility, whereas tab 36 flexes about a similar line of flexure 46. As tabs 34 and 36 flex outwardly in this fashion, they create substantial, arcuate openings 48 and 50, respectively, at the radially outboard edges of the tabs, adjacent the periphery of the end wall 16. Thus, the opening created by each pressure relief tab provides an arcuate opening at a predetermined pressure relief location for escape of fluids such as gases from the interior of the container.

As best appreciated with reference to FIGS. 5 and 6, each tab serves as a vane for directing the discharged fluids. Because each tab 36 and 34 typically deflects to only a limited extent, the tabs remain disposed at relatively small angles Q to the plane defined by the remainder of the end wall, transverse to axis 12. Thus, each tab directs the gas escaping through the associated opening generally along the plane of wall 16, and hence in a direction substantially transverse to axis 12. The thrust or reaction forces produced by the escaping gases thus likewise are directed generally along the plane of wall 16, transverse to axis 12. Because wall 16 is remote from the center of mass 21 of the cell, forces directed in the plane of wall 16, such as the major components of the thrust forces, tend to spin the cell about center of mass 21 rather than to accelerate the cell in translational movement. Although the escaping gases will have a minor component of velocity parallel to axis 12, and hence there will be minor thrust components parallel to the axis, these thrust components will be significantly less than the axial thrust component which would be produced if the gases were simply discharged through holes in the end wall, without the directing, vane-like action of the tabs.

Stated another way, the gas discharged through each opening 48 and 50 is directed generally transversely to the vector from the center of mass of the cell to such opening. Thus, fluid passing from opening 48 is directed at a substantial angle to the vector $V_{48}$ from center of mass 21 to opening 48, whereas fluid passing from opening 50 is directed at a substantial angle to the vector $V_{50}$ from the center of mass 21 to opening 50. As used in this disclosure, the term "substantial angle" means an angle greater than about 45°, and fluid may be considered as directed "substantially transversely" to a vector if the path of the fluid forms an angle greater than about 45° with the vector.

As best appreciated with reference to FIG. 6, the symmetrical, oppositely directed pressure relief tabs 34 and 36 tend to direct the fluid passing from the openings 48 and 50 in generally opposite directions along the plane of end wall 16. Thus, the fluid passing from opening 48 flows generally to the right as seen in FIG. 6, whereas the fluid passing from opening 50 flows generally to the left. Accordingly, the components of thrust or reaction forces in the plane of end wall 16 produced by the fluid flowing from these two openings tend to oppose and cancel one another, thus limiting any tendency of the cell to spin about center of mass 21. As will be readily appreciated, the strengths of the two lines of frangibility or score lines 38 and 40 may not be matched exactly, and the fluid pressures applied to pressure relief tabs 34 and 36 may also be unequal under the non-equilibrium conditions prevailing within the cell container during a sudden pressure rise. In some circumstances, one score line or the other may not rupture at all. However, even where only one score line ruptures and only one tab deflects, the fluid directing action provided by this aspect of the present invention still provides an important safety advantage. Where only one tab is opened, the thrust forces in the plane of wall 16 will not balance one another. However, as described above, the thrust forces, and hence the energy of the escaping fluids, will be expended principally in rotating the cell about its center of mass, rather than in translational acceleration of the cell. Thus, even in this case, the tendency of the cell to fly about as a projectile in the event of an overpressure release is materially reduced. Further, such unbalanced opening of the two pressure relief tabs is most likely to occur in the event of a relatively mild, gradual pressure increase. With a sudden violent pressure increase, both tabs typically open. Accordingly, the mutually counteracting thrust action afforded by the oppositely directed flows is provided in those cases where it is most useful.

The pressure relief tabs 34 and 36 may deflect to somewhat greater angles than desired in the event of an extraordinarily violent, sudden increase in internal pressure. Under these conditions, some of the escaping fluid may not be directed transversely to axis 12 or transversely to vectors $V_{48}$ and $V_{50}$. However, the tabs will still direct at least the first portions of the escaping fluids in the desired transverse directions. Furthermore, radial ridges can be created across these relief tabs 34 and 36, this tending to stiffen them and rendering it more difficult to bend these tabs, thus reducing or eliminating this minor potential problem. The first portions of the fluid pass through the openings 48 and 50 as soon as the tabs swing from their original undeflected position, and therefore pass through the openings while the pressure relief tabs are still bending about lines 44 and 46. Accordingly, the tabs will provide the most effective fluid directing action with respect to the first portions of the fluid expelled through openings 48 and 50. As the first portions typically are expelled more violently than subsequent portions, the tabs provide the most effective fluid directing action with respect to the most violently expelled fluids and direct the most violently expelled, first portion of the fluid most nearly in the plane of end wall 16 and most nearly transverse to axis 12.

The ultimate deflection angle Q attained by each tab during a pressure release depends on the aspect ratio of the tab. For given material, wall thickness and pressure conditions, the tab deflection angle is directly related to the aspect ratio of the tab; low aspect ratios tend to provide low tab deflection angles Q. The aspect ratio of each tab should be less than about 0.5, aspect ratios of between about 0.1 and about 0.3 being more preferred, and aspect ratios of about 0.25 being most preferred.

Low aspect ratio tabs as employed in preferred embodiments of the present invention also provide more room for substantial bridge portions 30 and 32. Bridge portions 30 and 32 substantially retain central portion 26 against movement relative to peripheral portion 28 and hence against movement relative to the side wall 10 and the remainder of the cell even when the wall ruptures along lines of frangibility 38 and 40 during an overpressure release. Thus, although there may be some slight bending of the bridge portions and the central portion, the central portion is substantially retained in place. As best appreciated with reference to FIG. 5, this action of the bridge portions retaining the central portion in place of the cell provides a further, substantial safety benefit. The rigid, relatively massive metallic core 18 of the internal cell structure is aligned with axis 12, and hence is aligned with the central portion 26. As gas is expelled from the end of the cell adjacent end wall 16 (the lower end of the cell as seen in FIG. 5) the pressure in that end of the cell typically falls more rapidly than the pressure in the opposite end of the cell. Accordingly, unequal fluid pressures are applied to windings 20, core 18 and other portions of the cell, which pressures tend to force the core and windings axially, towards end wall 16. Central portion 26, however, arrests the core and keeps the core within the cell container. Central portion 26 thus keeps the core from carrying windings 20 and the electrolytes associated therewith out of the cell, into the surrounding environment. Further, retention of the core keeps the core from becoming a hazardous projectile flying through the exterior environment.

The sloping transition surfaces at the ends of the lines of frangibility or score lines 38 and 40, such as sloping transition surface 42 (FIG. 3) tend to limit stress concentrations at the ends of the lines of frangibility or score lines and hence tend to prevent propagation of tears or cracks from lines of frangibility 38 and 40 into bridge portions 30 and 32 when the wall ruptures along the lines of frangibility.

As will readily be appreciated, numerous variations and combinations of the features described above can be utilized without departing from the present invention as defined in the claims. Merely by way of example, one of lines of frangibility 38 or 40 could be omitted, so as to provide an end wall structure, and hence a container, having only one pressure relief tab. In this single-tab struture, the space about the periphery of the end wall between diametrically opposed bridge portions 30 and 32 on the side opposite from the tab would be occupied by a continuous full thickness wall portion. Although a single-tab container would would not provide counterbalancing of thrusts directed in the plane of the end wall, as in the embodiment discussed above, it would provide the other advantages discussed above, such as dissipation of the energy of the escaping fluid principally in rotation of the cell rather than in translational acceleration, and retention of the core and other solid components arranged along the axis of the cell.

In a further variant, illustrated schematically in FIG. 7, three pressure relief tabs 134 are provided, these being partially bounded by three separate lines of frangibility 138. Three separate bridge portions 130 extend from the central portion of the end wall to the peripheral portion between these three separate lines of frangibility. In this case, the potential problem which is discussed above with respect to FIGS. 4 and 4a is avoided. This is, even with the score configuration shown in FIG. 4 in this case of three tabs 134, the possibility of creating an oblong or oval shape in the end wall itself is reduced because of the symmetrical nature of these three tabs. Therefore, in this case, the displacement of metal in all directions will evenly distribute same, and reduce or eliminate any advantages from using the configuration of FIG. 4a during a stamping operation. In the embodiment illustrated in FIG. 7, the bridge portions, tabs and lines of frangibility are symmetrical about center 122. Thus, where all three tabs are deflected by a violent pressure rise within the container, the escaping gas will be directed symmetrically with respect to the center of area and hence symmetrically, radially outwardly with respect to the axis of the container, thereby to provide a thrust counterbalancing effect similar to that described above with reference to FIGS. 1-6. In each of the embodiments described above, the largest angle between radii drawn from the center of the end wall to the center of adjacent bridge portions is 180° or less. Accordingly, in each of the embodiments described above, the bridge portions are loaded principally in tension, rather than in bending when loads are applied at the center of the wall, as by the core of the cell. This arrangement provides enhanced core retention with relatively thin end wall material.

In each of the embodiments described above, the curved lines of frangibility are smooth curves. However, a curved line may be composed of a plurality of interconnected straight line segments cooperatively defining a curve with discrete corners. Accordingly, the term "curved line of frangibility" as used in this disclosure should be understood as including lines of frangibility with discrete corners as well as smoothly curving lines of frangibility.

The present invention is further illustrated by the following, non-limiting example:

EXAMPLE

A cup-like assembly comprising a cylindrical tubular side wall and an end wall substantially as illustrated in FIGS. 1-4 above is made by deep-cup drawing nickel plated mild steel forming to American Iron and Steel Institute specification 1008 or 1009 or 1010, the steel being 0.254±0.020 mm thick and having a nickel plating layer of 0.003 mm ±0.0015 mm thickness. The steel, before drawing is at a No. 4 or No. 5 tempered condition, and is of aluminum killed draw quality. The interior diameter of the tubular side wall is 13.77 mm ±0.03 mm. The other dimensions of the finished container are set forth in Table I, below. In each case, the reference characters utilized to denote each dimension in Table I are the same as those used to denote the corresponding dimensions in FIGS. 1-4, and all dimensions are given in millimeters unless other specified.

TABLE I

| | |
|---|---|
| $R_1$ | 0.80 |
| $R_2$ | 0.08 |
| $R_3$ | 0.75 |
| $R_4$ | 0.25 |
| Z | 4.75 |
| T | 0.25 |
| D | |
| A | 40 degrees |
| X | 141 degrees |

Each tab has an aspect ratio of about 0.25. When the components of a lithium/molybdenium disulfide galvanic cell are assembled into the container and the container is sealed by a cap wall at the end remote from end wall 16, the end wall structure provides reliable pressure relief action.

What is claimed is:

1. A unitary end wall for an electrochemical cell container, said end wall comprising a central portion, encompassing the center of the wall, a peripheral portion surrounding said central portion, bridge means for connecting said central portion to said peripheral portion, one or more curved lines of frangibility and one or more pressure relief tabs remote from the center of the wall, each said pressure relief tab being bounded by one of said curved lines of frangibility extending only partially around the tab, said wall being substantially devoid of wrinkles or scores other than said one or more curved lines of frangibility, said wall being adapted to fracture along each said line of frangibility upon exposure to a pressure above a predetermined limit so that each said pressure relief tab can bend away from the remainder of said wall and provide an opening for relief of said pressure remote from the center of the wall, said bridge means being operative to retain said central portion in place relative to said peripheral portion upon fracture of said wall along said one or more lines of frangibility.

2. A wall as claimed in claim 1 wherein each said line of frangibility is concave towards said center of area and extends adjacent said peripheral portion.

3. A wall as claimed in claim 1 wherein the aspect ratio of each said pressure relief tab is less than about 0.5.

4. A wall as claimed in claim 1 further comprising means for preventing propagation of tears at the ends of each line of frangibility.

5. A wall as claimed in claim 4 wherein each said curved line of frangibility is a curved score line, the thickness of said wall at each said score line being less than the thickness of the adjacent regions of said wall, said tear propagation preventing means including a zone of gradually increasing thickness at each end of said score line.

6. A wall as claimed in claim 1 wherein said one or more pressure relief tabs include a plurality of pressure relief tabs and said one or more curved lines of frangibility include a plurality of curved lines of frangibility, said pressure relief tabs and said lines of frangibility being disposed circumferentially spaced around the center of the wall, said bridge means including a plurality of bridge portions extending from said central portion to said peripheral portion between said lines of frangibility at locations spaced circumferentially around the center of the wall.

7. A wall as claimed in claim 6 wherein each of said curved lines of frangibility is concave towards the center of the wall and extends from one of said bridge portions to another one of said bridge portions adjacent said peripheral portion.

8. A wall as claimed in claim 6 wherein the aspect ratio of each of said pressure relief tabs is less than about 0.5.

9. A wall as claimed in claim 7 wherein each of said lines of frangibility is an arc centered on the center of the wall.

10. A wall as claimed in claim 9 including only two of said pressure relief tabs and only two of said acs, the mid-points of said arcs being disposed at diametrically opposed locations with respect to the center of the wall, said arcs being of substantially equal radius and subtending substantially equal angles.

11. A wall as claimed in claim 10 wherein only two of said bridge portions are provided, said bridge portions being disposed at diametrically opposed locations with respect to the center of the wall.

12. A wall as claimed in claim 7 which is circular in shape.

13. A wall as claimed in claim 6 wherein said bridge portions are disposed around the center of the wall so that radii from said center of the wall to adjacent ones of said bridge portions define included angles of 180° or less.

14. A container for an electrochemical cell comprising an end wall as claimed in claim 1, and a tubular side wall defining a central axis, said tubular side wall being sealingly connected to said end wall about the periphery thereof so that said central axis passes through the center of said end wall.

15. A container as claimed in claim 14 wherein said side wall is formed integrally with said end wall.

16. A container as claimed in claim 14 further comprising a cap wall sealingly connected to said side wall remote from said end wall.

17. An electrochemical cell comprising a container as claimed in claim 16 and electrochemical means for producing a voltage disposed within said container, the center of mass of the cell being disposed remote from said end wall.

18. A cell as claimed in claim 17 wherein said electrochemical means includes a rigid core disposed adjacent said axis.

* * * * *

UNITED STATES PATENT AND TRADEMARK OFFICE
CERTIFICATE OF CORRECTION

PATENT NO. : 4,722,874

DATED : February 2, 1988

INVENTOR(S) : Geordon E. Marchak

It is certified that error appears in the above-identified patent and that said Letters Patent is hereby corrected as shown below:

Column 1, line 15, "ell" should read --cell--.
Column 4, line 36, "respective should read --respectively--.
Column 5, line 29, "along" should read --only--.
Column 6, line 3, "13" should read --23--.
Column 9, line 49, "This" should read --That--.
Column 10, line 7, "material" should read --materials--.
Column 12, line 8, "acs" should read --arcs--.

Signed and Sealed this

Twenty-first Day of June, 1988

Attest:

DONALD J. QUIGG

Attesting Officer

Commissioner of Patents and Trademarks